United States Patent [19]

Iwai et al.

[11] 4,405,589

[45] Sep. 20, 1983

[54] PROCESS FOR PRODUCING SILICON NITRIDE POWDER

[75] Inventors: Tadashi Iwai; Takashi Kawahito; Tetsuo Yamada, all of Ube, Japan

[73] Assignee: UBE Industries, Ltd., Japan

[21] Appl. No.: 439,436

[22] Filed: Nov. 5, 1982

[30] Foreign Application Priority Data

Nov. 17, 1981 [JP] Japan .................................. 56-183081

[51] Int. Cl.³ ........................ C01B 21/06; C01B 33/06
[52] U.S. Cl. .................................................. 423/344
[58] Field of Search ........................... 423/344; 501/97

[56] References Cited

U.S. PATENT DOCUMENTS

| 4,196,178 | 4/1980 | Iwai et al. | 423/344 |
|---|---|---|---|
| 4,264,565 | 4/1981 | Inoue et al. | 423/344 |
| 4,333,915 | 6/1982 | Iwai et al. | 423/324 |
| 4,333,916 | 6/1982 | Iwai et al. | 423/371 |

*Primary Examiner*—O. R. Vertiz
*Assistant Examiner*—Steven Capella
*Attorney, Agent, or Firm*—Finnegan, Henderson, Farabow, Garrett & Dunner

[57] ABSTRACT

Silicon nitride powder having a uniform particle size of regular crystals is produced by a process comprising the steps of:

(1) reacting (i) at least one compound having the general formula [I]

$$R_m SiCl_{4-m} \qquad [I]$$

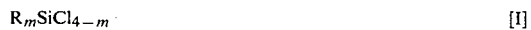

wherein R is an aliphatic residual group having 1 to 4 carbon atoms or an aromatic residual group having 6 to 8 carbon atoms and m is 1, 2, or 3 and (ii) a compound having the general formula [II]

$$H_n SiCl_{4-n} \qquad [II]$$

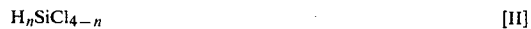

wherein n is 0, 1, 2, or 3, the ratio of silicon atoms to carbon atoms (Si/C) in both compounds [I] and [II] being 0.5 to 50 with ammonia and, then, (2) calcining the resultant reaction product in the first step at a temperature of 1200° C. to 1700° C. under an inert or reducing gas atmosphere.

5 Claims, 2 Drawing Figures $1\mu$

PROCESS FOR PRODUCING SILICON NITRIDE POWDER

BACKGROUND OF THE INVENTION

1. Field of the Invention

The present invention relates to a process for producing silicon nitride powder suitable for the production of sintered silicon nitride, useful as a superhard heat resisting material.

2. Description of the Prior Art

A typical known method is the so-called imide or amide decomposition method in which a silicon halide is reacted with ammonia and, then, the resulting silicon diimide or silicon tetramide is heated under an inert gas or ammonia gas atmosphere. This method, however, involves disadvantages in that the reaction of the silicon halide and the ammonia is a very vigorous exothermic reaction. Therefore, control of the reaction is very difficult. Further, a large amount of ammonium halide in the form of fumes is formed as a by-product. The deposition of the ammonium halide by-product on the inner surface of the reactor, the supply nozzles of the starting materials, and the tube wall of the gas outlet cause clogging and various other problems.

A technique has been proposed in Japanese Unexamined Patent Publication (Kokai) No. 54-145400 to eliminate the above-mentioned defects of the imide or amide decomposition method. According to this proposal, silicon nitride powder having a high purity can be obtained. However, this proposed method involves a disadvantage in that the resultant silicon nitride powder is difficult to handle because of a low tap density, due to the large number of needle crystals formed in the calcination step. Therefore, it is necessary to grind the silicon nitride powder and to increase the tap density before the calcination to obtain the sintered product.

SUMMARY OF THE INVENTION

Accordingly, an object of the present invention is to prevent the growth of the needle crystals during the calcination step as in the prior art and to provide a process capable of producing silicon nitride powder having uniform particle size, regular crystals.

Other objects and advantages of the present invention will be apparent from the description set forth hereinbelow.

In accordance with the present invention, there is provide a process for producing silicon nitride powder comprising the steps of: (1) reacting (i) at least one compound having the general formula [I]

$$R_m SiCl_{4-m} \qquad [\text{I}]$$

wherein R is an aliphatic residual group having 1 to 4 carbon atoms or an aromatic residual group having 6 to 8 carbon atoms, and m is 1, 2, or 3 and (ii) a compound having the general formula [II]

$$H_n SiCl_{4-n} \qquad [\text{II}]$$

wherein n is 0, 1, 2, or 3, the ratio of silicon atom to carbon atom (Si/C) in both compounds [I] and [II] being 0.5 to 50 with ammonia and, then, (2) calcining the resultant reaction product in the first step at a temperature of 1200° C. to 1700° C. under an inert or reducing gas atmosphere.

In accordance with the present invention, there is also provided a process for producing silicon nitride powder comprising the steps of:

(1) reacting (i) (a) at least one compound selected from the group consisting of trichloromethyl silane, dichlorodimethyl silane, and trichloroethyl silane or (b) a mixture thereof with at least one compound having the general formula $$R'_n SiCl_{4-n} \qquad [\text{III}]$$

wherein R' is an aliphatic residual group having 1 to 4 carbon atoms or an aromatic residual group having 6 to 8 carbon atoms and n is 1, 2, or 3, provided that R' is not a methyl group and an ethyl group in the case of n=1 and that R' is not a methyl group in the case of n=2, the ratio of silicon atoms to carbon atoms (Si/C) in the mixture being 0.5 to 50 with (ii) ammonia and, then, (2) calcining the resultant reaction product in the first step at a temperature of 1200° C. to 1700° C. under an inert or reducing atmosphere.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
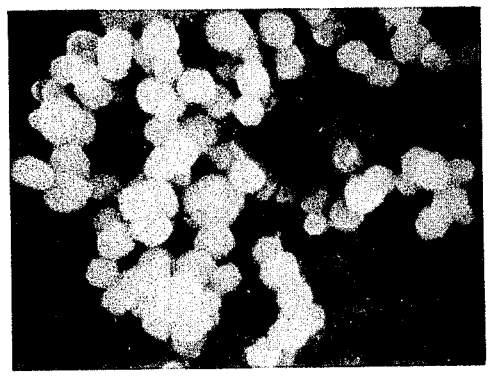
FIG. 1 is a photomicrograph, obtained by using a scanning type microscope, of the silicon nitride powder produced in Example 1.

According to the present invention, the desired silicon nitride powder having a high crystallizability and having a regular crystalline shape with a uniform particle size of 0.1 to 1 μm (micron) can be produced at a high yield. Furthermore, even if the reaction product of the first step accidentally comes into contact with oxygen before or after the calcination step, the oxygen content of the silicon nitride powder does not increase.

The first step of the present invention will now be explained.

Typical examples of the compounds represented by the above-mentioned general formula [I] are: chloroalkyl silanes such as trichloromethyl silane, trichloroethyl silane, trichloropropyl silane, dichlorodimethyl silane, dichlorodiethyl silane, dichlorodibutyl silane, chlorotriethyl silane, and chlorotripropyl silane; chloroalkenyl silane such as trichlorovinyl silane, dichlorodivinyl silane, trichloroallyl silane, and chlorotriallyl silane; chloroaryl silane such as trichlorophenyl silane, dichlorophenyl silane, chlorotriphenyl silane, trichlorotolyl silane, and dichloroditolyl silane; and chloroalkaryl silane such as trichlorobenzyl silane and dichlorodibenzyl silane.

Of these, compounds such as chloroaryl silanes having a relatively high boiling point and exhibiting a good solubility in a reaction solvent can be advantageously used when the reaction with ammonia is carried out in a liquid phase. On the other hand, when the reaction with ammonia is carried out in a gas phase, compounds such as chloroalkyl silanes having a relatively low boiling point can be advantageously used.

Typical examples of the compounds represented by the above-mentioned general formula [II] are tetrachlorosilane, trichlorosilane hydride, dichlorosilane dihydride, and chlorosilane trihydride.

The compounds [I] or the compounds [I] together with [II] should be used in amounts such that the overall ratio of silicon atoms to carbon atoms (Si/C) is 0.5 to 50, desirably 1 to 30. Of the compounds [I], trichloromethyl silane, which has a Si/C ratio of 1; dichlorodimethyl silane, which has a Si/C ratio of 0.5; and trichloroethyl silane, which has a Si/C ratio of 0.5, can therefore be used alone without using any compounds [II] in the reaction with ammonia. The other compounds [I], however, must be used together with compounds [II] to ensure an overall Si/C ratio within the range of 0.5 to 50. The above-mentioned three compounds can, of course, also be used together with compounds [II] in the reaction with ammonia.

A Si/C ratio of lower than 0.5 increases the free carbon content of the resultant silicon nitride powder and, therefore, decreases the sinterability thereof. The decrease in the sinterability requires an additional decarbonization step in which the free carbon contained in the silicon nitride is removed by heating the silicon nitride powder at a temperature of 300° C. to 800° C., desirably 500° C. to 700° C., under an oxidizing atmosphere such as air. This decarbonization step also involves a disadvantage in that a portion of the silicon nitride powder is undesirably oxidized by the local heating due to the combustion of the free carbon.

On the other hand, a Si/C ratio of higher than 50 increases the ratio of the undesired needle crystals contained in the resultant silicon nitride powder. More specifically, according to the process of the present invention, the compounds [I] or the compounds [I] and compounds [II] (occasionally referred to overall as "silicon compounds" hereinbelow) are reacted with ammonia under the specified conditions, followed by the heat decomposition (i.e., the calcination). In these processes, for instance, when chloroalkyl silanes are used as compound [I], a relatively small Si/C range such as 0.5 to 2 is desirably used because the alkyl group in the compound [I] is readily decomposed in the calcination step. Contrary to this, for instance, when chloroalkyl silanes are used as compound [I], a relatively large Si/C ratio range such as 1 to 50 is desirably used because the aryl group contained in the compound [I] is not easily decomposed in the calcination step.

The reaction of the silicon compounds with ammonia can be carried out either in a liquid phase or a vapor phase. It should be noted that although amines may be used in place of the ammonia, the use of amines is undesirable in practice because the removal and recovery operations of the unreacted amines are troublesome.

When the reaction of the silicon compounds with ammonia is carried out in a liquid phase, the silicon compounds are dissolved in an organic solvent and brought into contact with liquid or gaseous ammonia to react therewith. The organic solvents suitable for use in the above-mentioned reaction are those which do not react with the silicon compounds and the ammonia and also which remain liquids under the reaction conditions. Examples of such solvents are aliphatic hydrocarbons having 4 to 8 carbon atoms such as butane, pentane, hexane, and heptane and aromatic hydrocarbons such as benzene, toluene, and xylene.

When liquid ammonia is used, the desired reaction is advantageously carried out by a method as disclosed in Japanese Unexamined Patent Publication (Kokai) No. 54-145400. According to this method, the silicon compounds dissolved in the organic solvent are introduced into an organic solvent layer, which is present as a separate layer from a liquid ammonia layer in a reaction vessel, and the reaction occurs at the interface of the two layers.

When gaseous ammonia is used, the desired reaction is carried out by blowing the gaseous ammonia into the organic solvent solution of the silicon compound. In this reaction method, a gas feed pipe which is rotated at a high speed, as disclosed in Japanese Examined Patent Publication (Kokoku) No. 52-21991, is desirably used, since the solid reaction product tends to deposited and clogged the gas feed nozzle during a long-term continuous reaction.

The reaction temperature is desirably −80° C. to 30° C. The reaction pressure may be normal pressures in the case of gaseous ammonia or the saturated vapor pressure of ammonia at the reaction temperature or more in the case of liquid ammonia.

When the reaction of the silicon compounds with ammonia is carried out in a vapor phase, the silicon compounds are diluted with an inert gas such as nitrogen or argon and are desirably brought into contact with gaseous ammonia or gaseous ammonia diluted with an inert gas such as nitrogen or argon. In this case, of the compounds [I], those having a saturated vapor pressure of 50 mmHg or more at the reaction temperature are desirably used. The reaction temperature is desirably 0° C. to 200° C. and the reaction pressure may be around normal pressures.

Of the above-mentioned two types of reactions, the liquid phase reaction is desirable from the standpoints of the yield, density, and particle shape of the silicon nitride powder.

In both the liquid and vapor phase reactions, ammonia is desirably used in a stocihiometrically excess amount with respect to the silicon compounds. That is, 2 or more times, more desirably 3 to 20 times, of a molecular number of ammonia based on the atomic number of the chlorine bonded to the silicon in the silicon compounds is desirably used.

In the reaction of the above-mentioned silicon compounds with ammonia, a large amount of ammonium chloride is formed as a by-product together with the reaction product, i.e., a silicon imide or silicon amide. In the liquid phase reaction, if an excess amount of liquid ammonia is used, the ammonium chloride by-product will dissolve in the liquid ammonia, allowing the desired reaction product to be readily separated from the reaction mixture by, for example, filtration. In other cases, the ammonium chloride will precipitate as a bulky solid together with the desired reaction product. Most of this ammonium chloride will decompose in the subsequent calcination step and be exhausted out of the system, but a part will undergo a reverse reaction, thereby not only remarkably decreases the yield of the desired silicon nitride, but also creating the possibility of chlorine atoms bonded to the silicon atom remaining in the silicon nitride as impurities. Accordingly, it is desirable to remove the ammonium chloride from the desired reaction product by thoroughly washing the solid product with liquid ammonia after the filtration of the solid product from the reaction mixture.

The second step of the present invention will now be explained.

According to the present invention, the desired reaction product obtained from the first step is calcined by heating to cause decomposition. Thus, the crystallized silicon nitride powder can be obtained.

The calcination should be carried out under an inert gas atmosphere such as nitrogen, argon, or reducing gas atmosphere such as ammonia, a gas mixture of hydrogen and nitrogen, or a gas mixture of carbon monoxide and nitrogen. The decomposition of the reaction product of the first step is completed before the calcination temperature reaches about 1000° C. However, the silicon nitride powder obtained by calcination of up to about 1000° C. is an amorphous powder containing a trace amount of hydrogen atoms and having a very fine particle size of 0.01 μm or less. In order to obtain the desired crystallized silicon nitride powder in the shape of regular crystals having a particle size of 0.1 to 1.0 μm, the calcination should be carried out at a temperature of 1200° C. to 1700° C., desirably 1300° C. to 1600° C. The calcination time is desirably 1 to 5 hours.

The silicon nitride powder obtained from the present process contains free carbon atoms or carbon atoms bonded to the silicon atoms in the silicon nitride only in an amount not sufficient to hinder the production of the sintered silicon nitride. Furthermore, when the ratio of silicon atom to carbon atom (i.e., Si/C) in the starting silicon compound is low, in order to prevent the contamination of the silicon nitride with silica formed by oxygen accidentally included in each system of the present process, the calcined silicon nitride powder can be desirably subjected to any conventional decarbonization treatment to decrease the free carbon content in the silicon nitride powder.

The present invention will now be further illustrated by, but is by no means limited to, the following examples.

EXAMPLE 1

(1) Preparation of silicon imide

This preparation was carried out according to the method set forth in Japanese Unexamined Patent Publication (Kokai) 54-145400.

A vertical type reaction tube having a diameter of 4.5 cm and a height of 30 cm was cooled to a temperature of −40° C. and the air in the reaction tube was replaced with nitrogen. Then, 100 ml of liquid ammonia and 50 ml of toluene were charged into the reaction tube. These separated into an upper liquid ammonia layer and a lower toluene layer in the reaction tube. A total of 40 ml of a toluene solution of 49.5 mmol of silicon tetrachloride and 0.5 mmol of dichlorodiphenyl silane (Si/C ratio of the silicon compounds=100/12), previously prepared, was introduced into the slowly stirred lower layer through a feed pipe at a rate of about 10 ml/min. Simultaneously with the introduction of the toluene solution, a white reaction product was precipitated at the interface between the upper layer and the lower layer. The reaction product was filtered, then washed twice with 50 ml each liquid ammonia.

(2) Calcination of reaction product

The reaction product obtained above was heated at a temperature of 1000° C. for 2 hours to decompose, while the nitrogen gas was purged. The decomposed product was calcined by heating at a temperature of 1450° C. for 2 hours in a Tammann furnace, while nitrogen gas is purged. Thus, 2.2 g of off-white (or grayish-white) powder was obtained (the yield of the powder based on the silicon compounds was 95%).

As a result of X-ray diffraction analysis of the product, diffraction lines of alpha-silicon nitride and 5% or less of beta-silicon nitride were observed. The element analysis values of N, C and O by a inert gas fusion method were 38.5%, 1.2%, and 1.5%, respectively. Only 100 ppm or less each of Fe, Al, Ca, K, and Cl were detected other than the main component, Si, by X-ray fluorescence analysis. The tap density of the resultant powder was 1.2 g/cm$^2$, and the Brunaver-Emmett-Teller (BET) specific surface area by a nitrogen adsorption method of the powder was 6 m$^3$/g. Only regular crystal type powder particles having a particle size of 0.5 to 1.0 μm were observed by a scanning type electron microscope as shown in FIG. 1.

COMPARATIVE EXAMPLE 1

A total of 2.1 g of off-white powder was obtained in the same manner as in Example 1, except that 50 mmol of silicon tetrachloride was used without using dichlorodiphenyl silane.

As a result of X-ray diffraction analysis of the powder, a broad diffraction line of alpha-silicon nitride exhibiting an insufficient crystallization was observed.

Thereafter, the powder was calcined at a temperature of 1550° C. for 2 hours in the same manner as in Example 1-(2). As a result of X-ray diffraction analysis of the calcined product, diffraction lines of alpha-silicon nitride and 5% to 10% of beta-silicon nitride were observed. The other analytical data were as follows.

Elemental analysis: N: 39.2%, C: 0.5%, O: 1.8%.

Content of each of Fe, Al, Ca, K, and Cl: 100 ppm or less.

Tap density: 0.6 g/cm$^3$.

Specific surface area: 10 m$^2$/g.

Figure 2:
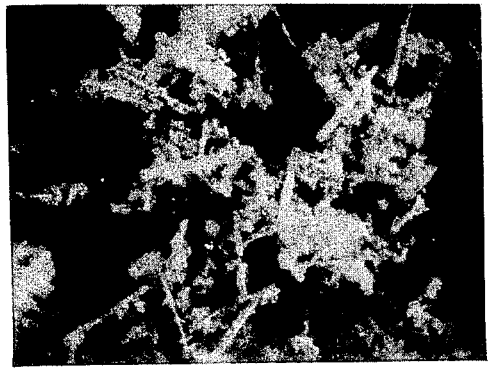
FIG. 2 is a photomicrograph, obtained by using a scanning type microscope, of the silicon nitride powder produced in Comparative Example 1.

Observation of product by scanning type electron microscope: Aggregates of micro particles having a size of about 0.1 μm and needle-like crystals having a diameter of 0.2 μm and a length of about 1 to 10 μm (see FIG. 2).

EXAMPLE 2

Off-white powder was obtained in the same manner as in Example 1, except that a mixture of 49.5 mmol of silicon tetrachloride and 0.5 mmol of phenyltrichloro silane (ratio of Si/C in the silicon compounds=100/6) was used. The yield of the desired product was 2.3 g (98% based on the silicon compounds).

The results of the X-ray diffraction analysis, the elemental analysis of N, C, and O, the BET specific surface area, and the tap density are shown in Table 1.

EXAMPLE 3

A reaction product mainly composed of silicon diimide was obtained in the same manner as in Example 1, except that a mixture of 48.5 mmol of silicon tetrachloride and 1.5 mmol of methylphenyldichloro silane (ratio of Si/C in the silicon compounds=100/21) was used. The reaction mixture was calcined by heating at a temperature of 1400° C. for 2 hours in a Tammann furnace, while nitrogen gas was purged. Thus, 1.9 g of off-white powder was obtained (the yield based on the silicon compounds was 81%).

Various analytical data of the resultant powder are shown in Table 1.

EXAMPLE 4

A reaction product mainly composed of silicon diimide was obtained in the same manner as in Example 1, except that a mixture of 49.9 mmol trichlorosilane hydride and 0.1 mmol of diphenyldichloro silane (ratio of Si/C in the silicon compounds = 100/2.4) was used. The reaction product was calcined in a Tammann furnace at a temperature of 1360° C. for 2 hours, while nitrogen gas was purged. Thus, 2.0 g of off-white powder was obtained (the yield based on the silicon compounds was 86%).

Various analytical data of the resultant powder are shown in Table 1.

TABLE 1

| Example No. | X-ray analysis % alpha-crystal | beta-crystal | Element analysis (wt %) N | C | O | Specific surface area (m²/g) | Tap density (g/cm³) |
|---|---|---|---|---|---|---|---|
| 2 | 95 | 5 | 38.3 | 1.0 | 1.2 | 5.5 | 1.4 |
| 3 | 98 | 2 | 38.7 | 1.4 | 0.8 | 6.4 | 1.3 |
| 4 | 100 | 0 | 38.1 | 0.7 | 1.7 | 7.2 | 1.1 |

The contents of Fe, Al, Ca, K, and Cl of the silicon nitride powder products obtained in Examples 2 to 4 were each 100 ppm or less. These products contained regular crystal type particles each having a size of 0.3 to 1.0 μm, as a result of scanning type electron microscope observation.

EXAMPLE 5

A mixture of 8.0 g of silicon tetrachloride and 0.8 g of diphenylsilane dichloride (ratio of Si/C in the silicon compounds = 100/72) was dissolved in 500 ml of toluene. This solution was charged into a 1 liter reactor of which the atmosphere was previously replaced with nitrogen. Then, nitrogen gas containing 20 vol% of ammonia gas was introduced into the solution at a temperature of −10° C. at a feed rate of 0.5 Nl/min for 2 hours, while stirring. The resultant bulky white solid was obtained by filtration under a nitrogen atmosphere and was, then, washed five times with 50 ml each liquid ammonia.

The powder thus obtained was heated at a temperature of 1000° C. for 2 hours and was then calcined at a temperature of 1460° C. for 2 hours in a tubular type Tammann furnace, while nitrogen gas was purged. Thus, 2.3 g of blackish gray powder was obtained. The powder was heat treated at a temperature of 600° C. for 8 hours, while air was purged. As a result, 1.9 g of off-white powder was obtained (the yield based on the silicon compounds was 82%).

Analytical data of the resultant powder are shown in Table 2. The content of each of Fe, Al, Ca, K, and Cl in the powder was 100 ppm or less. Only regular crystal type powder particles having a size of 0.5 to 1.0 μm was observed by a scanning type electron microscope.

EXAMPLE 6

A cyclone type glass vessel having an inner volume of 3 liters and provided with three gas feed pipes and one gas discharge pipe was purged with nitrogen to replace the air. Then, nitrogen gas containing 5% by volume of trichlorosilane hydride, nitrogen gas containing 5% by volume of dimethylsilane dichloride, and ammonia gas were separately introduced through the three gas feed pipes at a rate of 0.3 Nl/min, 0.3 Nl/min, and 0.5 Nl/min for 2 hours to be allowed to react at a temperature of 0° C. Bulky white solid was deposited on the inner surface and the bottom of the vessel. Toluene was fed into the vessel to recover the solid as a slurry. The solid was separated from the slurry by filtration.

The solid thus obtained was placed in a quartz boat. The solid was heated at a temperature of 500° C. for 2 hours and, then, at a temperature of 1000° C. for 2 hours in a tubular electric furnace to effect the decomposition, while nitrogen gas was purged. The decomposed product was calcined at a temperature of 1400° C. for 2 hours to produce 4.7 g of blackish off-white powder. The powder was then heat treated at a temperature of 600° C. for 8 hours, while air was purged. Thus, 4.5 g of off-white powder was obtained (the yield based on the silicon compounds was 60%).

Analytical data of the powder are shown in Table 2. The content of each of Fe, Al, Ca, K, and Cl in the powder was 100 ppm or less. As a result of scanning type electron microscope observation, most of the powder particles was found to be regular crystal type particles having a size of about 0.5 μm, although a small amount of needle type crystals was contained.

TABLE 2

| Example No. | X-ray analysis (%) alpha-crystal | beta-crystal | Element analysis (wt %) N | C | O | Specific surface area (m²/g) | Tap density (g/cm³) |
|---|---|---|---|---|---|---|---|
| 5 | 93 | 7 | 37.8 | 1.2 | 2.1 | 3.7 | 1.3 |
| 6 | 94 | 6 | 37.5 | 1.8 | 2.5 | 6.0 | 0.8 |

We claim:
1. A process for producing silicon nitride powder comprising the steps of:
(1) reacting (i) at least one compound having the general formula [I]

$$R_m SiCl_{4-m} \qquad [I]$$

wherein R is an aliphatic residual group having 1 to 4 carbon atoms or an aromatic residual group having 6 to 8 carbon atoms, and m is 1, 2, or 3 and (ii) a compound having the general formula [II]

$$H_n SiCl_{4-n} \qquad [II]$$

wherein n is 0, 1, 2, or 3, the ratio of silicon atom to carbon atom (Si/C) in both compounds [I] and [II] being 0.5 to 50 with ammonia and, then,
(2) calcining the resultant reaction product in the first step at a temperature of 1200° C. to 1700° C. under an inert or reducing gas atmosphere.

2. A process as claimed in claim 1, wherein the reaction of step (1) is carried out at a temperature of −80° C. to 30° C. in a liquid phase.

3. A process as claimed in claim 1, wherein the reaction step (1) is carried out at a temperature of 0° C. to 200° C. in a vapor phase.

4. A process as claimed in claim 1, wherein the reaction of the step (1) is carried out by using ammonia in an amount of at least 2 times of the molecular number based on the atomic number of the chlorine bonded to the silicon in the compounds [I] and [II].

5. A process for producing silicon nitride powder comprising the steps of:
(1) reacting (i) (a) at least one compound selected from the group consisting of trichloromethyl silane, dichlorodimethyl silane, and trichloroethyl silane or (b) a mixture thereof with at least one compound having the general formula $$R'_n SiCl_{4-n} \qquad \text{[III]}$$

wherein R' is an aliphatic residual group having 1 to 4 carbon atoms or an aromatic residual group having 6 to 8 carbon atoms and n is 1, 2, or 3, provided that R' is not a methyl group and an ethyl group in the case of n=1 and that R' is not a methyl group in the case of n=2, the ratio of silicon atoms to carbon atoms (Si/C) in the mixture being 0.5 to 50 with (ii) ammonia and, then, (2) calcining the resultant reaction product in the first step at a temperature of 1200° C. to 1700° C. under an inert or reducing atmosphere.

* * * * *